(12) United States Patent
Malin

(10) Patent No.: US 12,475,344 B2
(45) Date of Patent: Nov. 18, 2025

(54) CODE SCANNER FOR CAPTURING CODES ON TUBES IN A TUBE RACK

(71) Applicant: LICONIC AG, Mauren (LI)

(72) Inventor: Cosmas Malin, Mauren (LI)

(73) Assignee: LICONIC AG, Mauren (LI)

( * ) Notice: Subject to any disclaimer, the term of this patent is extended or adjusted under 35 U.S.C. 154(b) by 0 days.

(21) Appl. No.: 18/573,530

(22) PCT Filed: Jun. 21, 2022

(86) PCT No.: PCT/EP2022/066919
§ 371 (c)(1),
(2) Date: Dec. 22, 2023

(87) PCT Pub. No.: WO2022/268833
PCT Pub. Date: Dec. 29, 2022

(65) Prior Publication Data
US 2024/0232554 A1    Jul. 11, 2024

(30) Foreign Application Priority Data

Jun. 23, 2021 (CH) ...................................... 0729/21

(51) Int. Cl.
*G06K 7/14*        (2006.01)
(52) U.S. Cl.
CPC ......... *G06K 7/1417* (2013.01); *G06K 7/1413* (2013.01)
(58) Field of Classification Search
CPC ............................ G06K 7/1417; G06K 7/1413
USPC ....................................................... 235/462.1
See application file for complete search history.

(56) References Cited

U.S. PATENT DOCUMENTS

| 10,706,247 | B1* | 7/2020 | Miller | .................. G06K 7/1413 |
| 2013/0129166 | A1* | 5/2013 | Muller | ............. B01L 3/502761 |
| | | | | 382/128 |
| 2013/0306729 | A1 | 11/2013 | Dilks et al. | |
| 2014/0374480 | A1* | 12/2014 | Pollack | ..................... B01L 9/06 |
| | | | | 235/440 |
| 2018/0372768 | A1* | 12/2018 | Bryant | ............... G01N 35/1083 |

(Continued)

FOREIGN PATENT DOCUMENTS

EP          2 682 756          1/2014

OTHER PUBLICATIONS

Int'l Search Report (Form PCT/ISA/210) conducted in Int'l Appln. No. PCT/EP2022/066919 (Oct. 25, 2022).

(Continued)

*Primary Examiner* — Michael G Lee
*Assistant Examiner* — David Tardif
(74) *Attorney, Agent, or Firm* — GREENBLUM & BERNSTEIN, P.L.C.

(57) ABSTRACT

A code scanner is provided for capturing visual codes at the bottom of a plurality of test tubes in a tube rack. The scanner comprises a base and a tube rack support mounted to the base for supporting a tube rack. At least one camera is focused on an object plane at the bottom of the tubes. A transparent cover glass is arranged between the camera and the object plane. The tube rack support has a viewing opening and, at several locations around the viewing opening, support members for laterally supporting the tube rack. The cover glass is located at a distance from and below the support members. Thus, it is less likely to acquire dirt and any dirt thereon will be out of the object plane of the imaging optics.

17 Claims, 3 Drawing Sheets

(56) References Cited

U.S. PATENT DOCUMENTS

2020/0191812 A1* 6/2020 Dilks ................. G06K 7/10861
2024/0424160 A1* 12/2024 Sivertsen ................. A61L 2/24

OTHER PUBLICATIONS

Int'l Written Opinion (Form PCT/ISA/237) conducted in Int'l Appln. No. PCT/EP2022/066919 (Oct. 25, 2022).

* cited by examiner

CODE SCANNER FOR CAPTURING CODES ON TUBES IN A TUBE RACK

TECHNICAL FIELD

The invention relates to a code scanner for capturing visual codes on test tubes in a tube rack as well as to a method for operating the same.

BACKGROUND ART

EP2682756 describes a code scanner device for capturing visual codes on the bottom side of a plurality of test tubes in a tube rack. It has a base and a transparent window held in the base. The transparent window serves as a tube rack support.

A camera views the window from below, with its optics being focused on an object plane at the level of the top surface of the window. It takes pictures of the codes at the bottom surfaces of the tubes in the tube rack.

In this type of device, dirt on the window tends to affect the quality of the images and to decrease the accuracy of the scanning process.

DISCLOSURE OF THE INVENTION

Hence, the problem to be solved by the present invention is to provide a scanner of this type and a method for operating it that exhibit improved reliability.

This problem is solved by the scanner and the method of the independent claims.

Accordingly, the invention relates to a code scanner device for capturing visual codes at the bottom sides of a plurality of test tubes in a tube rack. The scanner comprises at least the following elements:

A base: This is the structural part holding the elements of the device together. Advantageously, it is designed as an enclosure.

A tube rack support mounted to the base: The tube rack support is adapted and structured to support a tube rack placed onto it, with the bottom of the tube rack in contact with the top of the rack support. Advantageously, it comprises alignment means to accurately position the tube rack in horizontal direction.

One or more camera mounted to the base: This camera is used to scan the codes. There may be multiple such cameras. It comprises imaging optics focused on an object plane at a level of the bottom of the tubes. In this context, "at a level of the tube rack support" is to be understood as a plane at the top of the rack support, in particular as a plane located not more than 5 mm, in particular not more than 2 mm, above the top of the rack support.

A transparent cover glass arranged between the camera and the object plane: This cover glass protects the camera optics from particles or damage.

Further, the tube rack support has a viewing opening, i.e. a region that is not covered by a window nor other opaque or non-opaque solid materials. To support the tube rack, the tube rack support has support members located at several locations around this viewing opening. The support members are adapted and structured to support the periphery of the tube rack. As mentioned, there may also be alignment means to define the horizontal position of the tube rack.

The cover glass is located at a distance from and below the support members. Thus, in operation, the tube rack sitting on the support members does not contact the cover glass, which reduces the risk of depositing dirt on the cover glass.

In addition, the position of the cover glass may allow for accessing the tube rack from below by means of an automated transport mechanism.

When placing the cover glass sufficiently far out of the object plane of the camera, any particles or scratches on the cover glass are out of focus and make the imaging system more robust.

Hence, the scanner becomes more reliable.

Advantageously, the distance $D1$ between the cover glass and the top of the tube rack support is large. If $D2$ is the optical distance between the imaging optics and the top of the tube rack support, the following relation should be fulfilled:

$$D1 > k \cdot D2,$$

with k being at least 0.1, in particular at least 0.25.

In this case, the cover glass is well away from the object plane, and, therefore, any dirt on it will be out of focus at the image plane. Hence, localized dirt on the cover glass is unlikely to affect the scanning process.

The scanner may further comprise a tube rack frame extending above the support members and defining lateral stops for horizontally confining the tube rack when it is located on the rack support.

Advantageously, there are advantageously exactly three or four support members located spaced apart at the four corners of a rectangle. This provides good mechanical stability for the tube rack while increasing the area of the tube rack that is directly visible from below.

The scanner may further comprise at least one access opening extending downwards from an edge of the viewing opening. An interior chamber of the scanner extends between the viewing opening and the cover glass and laterally borders on (i.e. is open towards) the access opening.

In such a design, the chamber is open from above and from a side, with no obstacles between the viewing opening and the openings. Hence, a shovel can be introduced into the chamber through the access opening and then lifted vertically up to leave the chamber through the top opening and vice versa. This allows to pick up and to set down the tube rack by means of such a shovel.

The method for operating the scanner comprises at least the following steps:

Placing a tube rack on the tube rack support; and

Scanning the visual codes on a plurality of test tubes in the tube rack by viewing them with the camera through the viewing opening.

If the scanner has a access opening and an interior chamber as defined above, the method may further comprise at least one of the following steps:

Moving a shovel supporting a tube rack from above through the viewing opening to deposit the tube rack on the rack support and then retrieving the shovel through the access opening; and/or Inserting the shovel through the access opening and raising it through the viewing opening, thereby picking up a tube rack deposited on the rack support.

BRIEF DESCRIPTION OF THE DRAWINGS

The invention will be better understood and objects other than those set forth above will become apparent when consideration is given to the following de-tailed description thereof. Such description makes reference to the annexed drawings, wherein.

MODES FOR CARRYING OUT THE INVENTION

Definitions

The vertical direction and terms such as "up", "down", "above", and "below" are to be understood for the operating position of the scanner. In this operating position, the camera views the viewing opening from below because the tube rack sits on top of the support members.

A "horizontal" direction is perpendicular to the vertical direction.

The expression "at a distance from" is to be understood that two objects are located at a non-zero distance from each other.

The "optical distance" between the imaging optics and the top of the tube rack support is the path length along the optical axis of the imaging system between the optics and the top of the tube rack support. If, for example, a mirror is located within this path, the path will not be a straight line, i.e. the optical distance does, in this case not correspond to the (direct) physical distance.

Scanner

Figure 1:
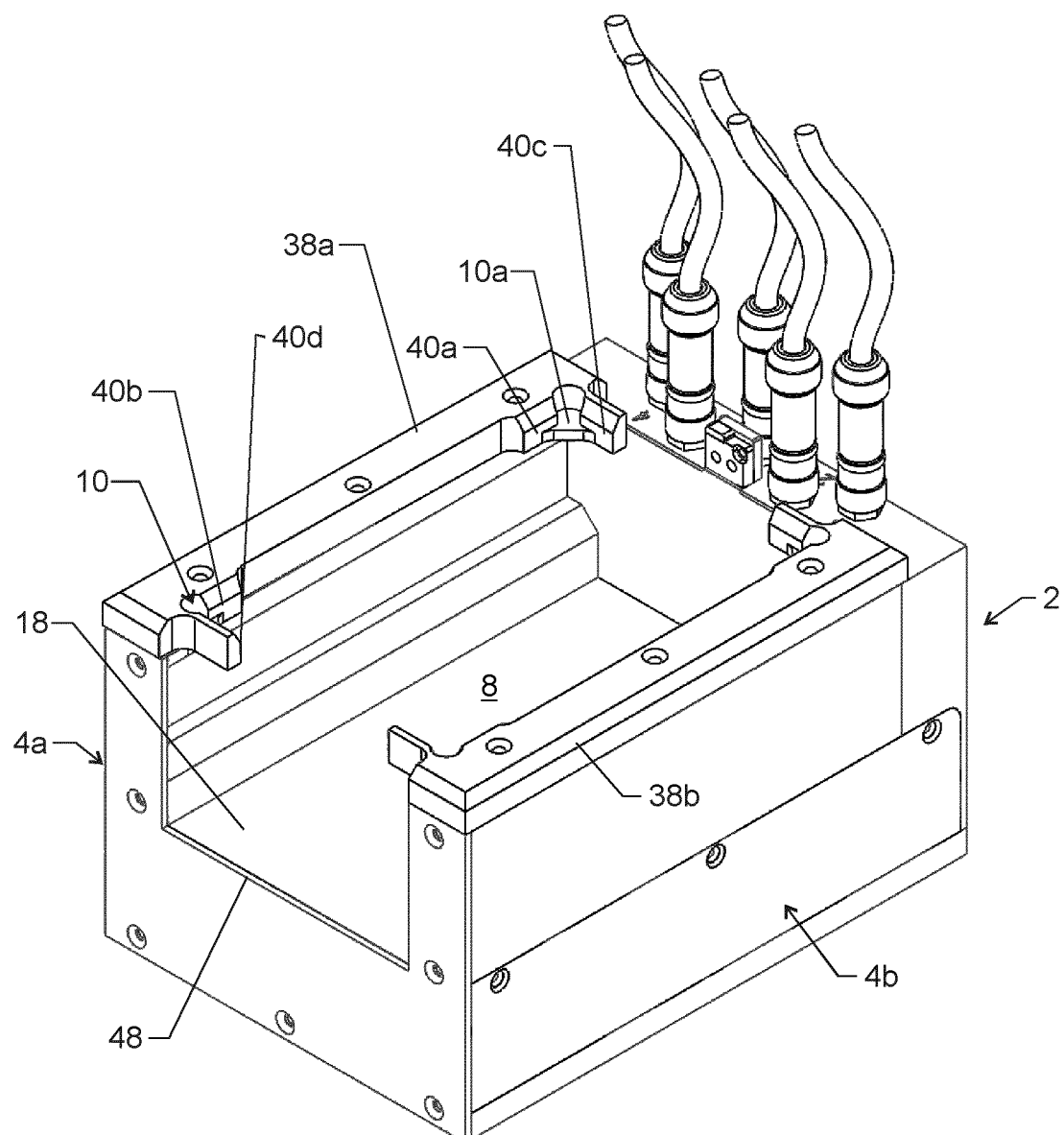
FIG. 1 shows a view of an embodiment of a scanner.
Figure 2:
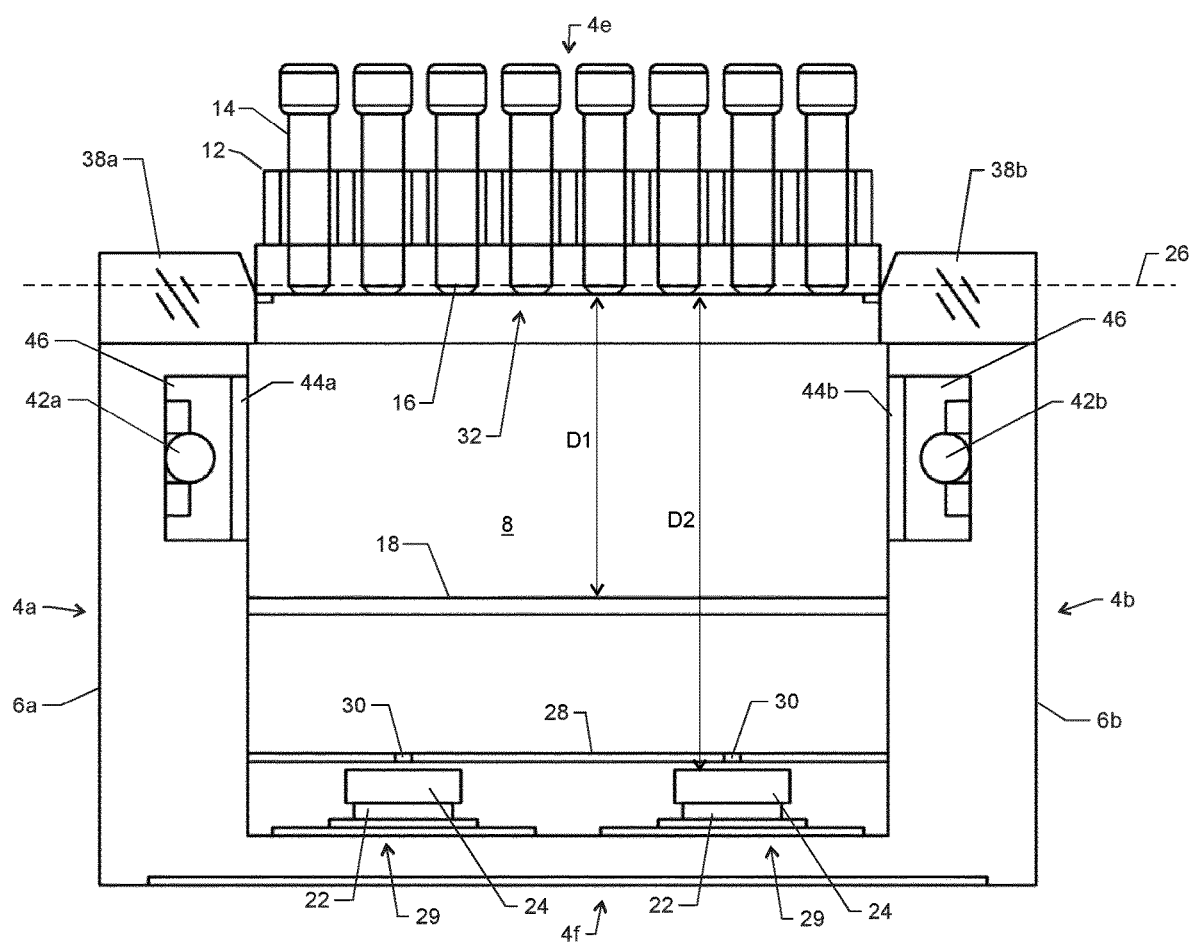
FIG. 2 shows a somewhat simplified sectional view of the scanner along a vertical plane extending through the cameras with a tube rack resting on the tube rack support.
Figure 3:
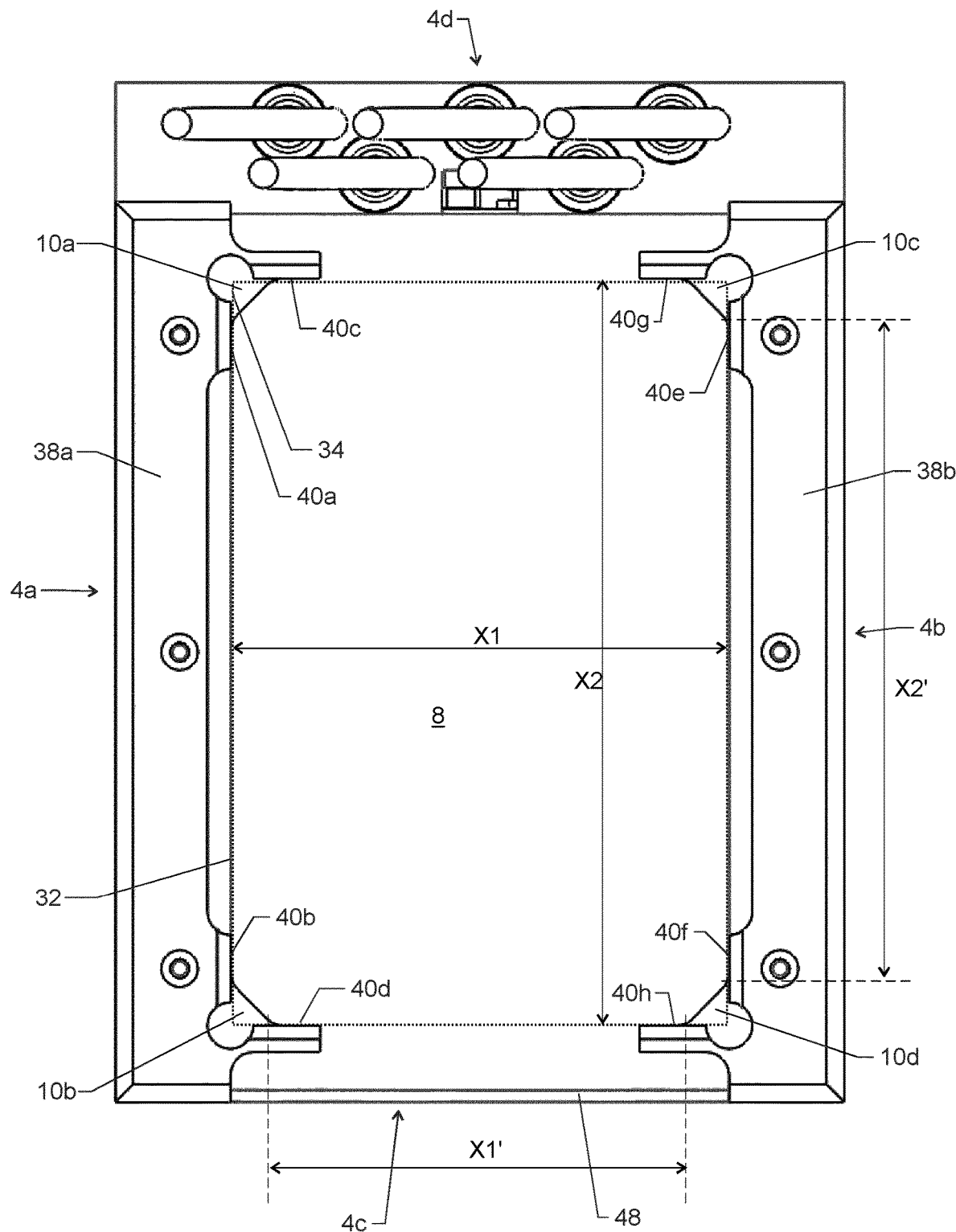
FIG. 3 shows a top view of the scanner.

The scanner shown in FIGS. 1-3 comprises a base 2, and it has a first lateral side 4a, a second lateral side 4b, a front side 4c, a back side 4d, a top side 4e, and a bottom side 4f (see FIGS. 2 and 3).

In the present embodiment, base 2 forms an enclosure of the device and encloses the interior of the device from at least the two lateral sides 4a, 4b, the bottom side 4f and, optionally, the back side 4d.

Advantageously, base 2 forms vertical walls 6a, 6b on the first and second lateral sides 4a, 4b and it may also form a vertical wall at the back side 4c, which delimit an interior chamber 8.

Further, the scanner comprises a tube rack support 10 for receiving a tube rack 12 (which is only shown in FIG. 2). Tube rack 12 holds an array of test tubes 14. The test tubes 14 have machine-readable, visual codes, in particular QR codes or barcodes, at their bottom sides 16. They may be printed onto the test tubes 14 or be applied to the test tubes 14 on a separate carrier. They may also be embedded within the bottom of the tubes to prevent them from being scratched.

A transparent cover glass 18 is arranged below chamber 8, and one or more cameras 20 are located below cover glass 18.

The cameras 20 e.g. comprise a camera sensor 22 with an array of light-sensitive pixels and imaging optics 24.

Each imaging optics 24 is focused on an object plane 26 and projects it into an image plane at the respective camera sensor 22.

Object plane 26 is located at the level of the visual codes on the bottom sides 16 of the tube racks 14. Typically, object plane 26 does not exactly coincide with the bottom side of rack 12 but may in particular be somewhat higher, i.e. somewhat above the top side of tube rack support 10.

On the optical axis of each camera, a pinhole 30 in a non-transparent pinhole mask 28 may be provided to prevent stray light and reflected light from reaching the camera sensors 22. Pinhole mask 28 and pinhole 30 is advantageously located between camera 20 and cover glass 18.

Pinhole mask 28 is advantageously black and matte in order to reduce reflections, in particular specular reflections.

As best seen in FIGS. 1 and 3, tube rack support 10 is arranged around a viewing opening 32.

For scanning standardized tube racks 12, viewing opening 32 advantageously has a size adapted to the SBS footprint of 128 mm×85 mm. Advantageously, it has a width (x1) between 80 mm and 90 mm and a length between 120 mm and 135 mm.

Tube rack support 10 may be formed by four support members 10a, 10b, 10c, 10d located at the corners of a rectangle 34 (shown in dotted lines in FIG. 3) surrounding viewing opening 32. Advantageously, in order to prevent the support members 10a, 10b, 10c, 10d from obstructing too much of the bottom side of tube rack 12, they are advantageously small and far apart. In particular, the distance X1', X2' between neighboring support members 10a-10d is at least 0.9 times the extension X1, X2 of the respective side of rectangle 34.

In the embodiment shown, each support member 10a-10d is formed by a triangular ledge at a corner of rectangle 34.

As can be seen in FIGS. 1 and 3, the scanner further comprises a tube rack frame 38a, 38b, which projects above the top surface of the support members 10a-10d and defines lateral stops 40a-40h forming alignment means that horizontally confine tube rack 12 in its position on rack support 10.

In the shown embodiment, the lateral stops 40a-40h confine tube rack 12 in all horizontal directions, thereby securing it at a defined horizontal position.

As shown, rack frame 38a, 38b may comprise a first frame member 38a and a second frame member 38b located at a distance from each other on opposite sides of viewing opening 32.

Each such frame member 38a, 38b may be U-shaped to enclose viewing opening 32 from three adjacent sides.

The scanner further comprises light sources 42a, 42b (not shown in FIG. 1) for illuminating the visual codes from below through viewing opening 32. In the shown embodiment, there are two such light sources 42a and 42b. Advantageously, each light source 42a, 42b is strip-shaped (i.e. elongate, e.g. formed by a plurality of individual LEDs arranged in a row) and advantageously extends horizontally. They may be arranged in recesses 46 in the vertical walls of chamber 8, which favors indirect illumination of the bottom of the tubes and the cameras (pinholes 30).

Diffusor elements 44a, 44b are arranged on opposite walls of chamber 8. They separate chamber 8 from the light sources 42a, 42b and scatter their light diffusely in order to generate a homogeneous illumination.

Advantageously, the light sources 42a, 42b are arranged on elongate sides (longer walls) of chamber 8 for providing a more uniform illumination.

As can best be seen in FIG. 1, viewing opening 32 is arranged in a horizontal plane and provides vertical access to chamber 8.

The device may further comprise at least one access opening 48 in front side 4c, which provides horizontal access to chamber 8 (see FIGS. 1 and 3) for the shovel of an automated transport mechanism. Access opening 48 may e.g. be arranged in a vertical plane.

Access opening 48 extends downwards from an edge of viewing opening 32, i.e. viewing opening 32 and access opening 48 form a joint, larger opening that allows access to chamber 8 from two sides.

Advantageously, cover glass 18 is arranged not higher than the lower edge of access opening 48, thus sealing chamber 8 from below.

This design allows to easily load and unload tube racks as described in following section.

Cover glass 18 is arranged horizontally. It may e.g. be of glass or plastics, and it is transparent at least for the light used in the scanning process. As mentioned, it is advantageously located far away from object plane 26, i.e. out of the focal plane of the imaging optics 24, such that localized dirt thereon is not resolved in the camera sensors.

In this context, "far away" is best expressed in the context of the distances D1 and D2 shown in FIG. 2.

Here, D1 designates the distance between the top of tube rack support 10 (which corresponds to the top surface of the support members 10a, 10b, 10c, 10d). D2 designates the distance between the imaging optics 24 and the top of tube rack support 10.

Since the top of tube rack support 10 is almost at the same vertical level as the bottom sides 16 of the test tubes 14, typically within a distance of less than 5 mm, in particular of less than 2 mm, D1 and D2 basically correspond to the distances between cover glass 18 and object plane 26 and between imaging optics 24 and object plane 26.

In this case, the distance D2 should be a substantial fraction k of the distance D1 such that cover glass 18 is well out of the object plane 26, and details thereon are not resolved by the cameras 20.

Hence, in an advantageous embodiment and as mentioned above, $$D1 > k \cdot D2,$$

with k being at least 0.1, in particular at least 0.25.

Method of Operation

For scanning the visual codes on the test tubes 14 in a tube rack 12, the tube rack is placed on tube rack support 10, with its corners resting on the support members 10a-10d. Advantageously, only the corners of tube rack 12 are in vertical contact with rack support 10, and all the remaining bottom area of tube rack 12 can be viewed through viewing opening 32.

Then, the cameras 20 are operated to make an image of all the visual codes on the test tubes through the bottom of tube rack 12.

Advantageously, a plurality of or all these codes are recorded at the same time.

To place a tube rack 12 in the device, the tube rack may be loaded onto a shovel, i.e. on a support element that supports the tube rack from below. This shovel may e.g. be operated by a robot mechanism.

With tube rack 12 on top of it, the shovel is lowered through viewing opening 32 from above and enters chamber 8, with the part of the shovel connected to the robot extending through access opening 48. When tube rack 12 reaches the support members 10a-10d, it is deposited thereon.

The shovel can then be retracted through access opening 48, and the scanning process can take place.

After the scanning process, the shovel can again be introduced, through access opening 48, into chamber 8 and then be raised to engage tube rack 12 sitting in tube rack support 10. The shovel is raised through viewing opening 32 to move tube rack 12 away from the scanner.

Notes

Rack frame 38a, 38b and/or rack support 10 may at least be in part of a transparent material in order not to obstruct light from reaching the bottom sides 16 of the test racks 14, in particular of those located along the periphery of tube rack 12.

In the example above, the support members 10a-10d are formed by triangular ledges at the corners of rectangle 34. They may also be formed by longer ledges extending around at least some or all sides of viewing opening 32.

In the embodiments above, one or more cameras are stationary mounted within base 2. Alternatively, there may be one or more movable cameras that can be horizontally translated within base 2 to scan the test tubes.

Instead of placing the camera(s) at the bottom of the device, they may also be located in one or more of the side walls of chamber 8 and view the bottom of the tube racks through a mirror, in particular a semi-transparent mirror. In that case, the illumination may be located at the bottom of the device.

While there are shown and described presently preferred embodiments of the invention, it is to be distinctly understood that the invention is not limited thereto but may be otherwise variously embodied and practiced within the scope of the following claims.

The invention claimed is:

1. A code scanner for capturing visual codes at bottom sides of a plurality of test tubes in a tube rack, wherein said scanner comprises
   a base,
   a tube rack support mounted to the base for supporting a tube rack placed onto said tube rack support,
   at least one camera mounted to said base, wherein said camera comprises imaging optics focused on an object plane at a level of said tube rack support,
   a transparent cover glass arranged between the camera and the object plane,
   wherein said tube rack support has a viewing opening and, at several locations around said viewing opening, support members for laterally supporting the tube rack, and wherein the cover glass is located at a distance from and below the support members, and
   wherein, for
      D1 being a distance between the cover glass and a top of the tube rack support and
      D2 being an optical distance between the imaging optics and the top of the tube rack support, $$D1 > k \cdot D2,$$

with k being at least 0.1.

2. The scanner of claim 1 further comprising a tube rack frame projecting above the support members and defining lateral stops for horizontally confining the tube rack.

3. The scanner of claim 2 wherein said rack frame comprises a first frame member and a second frame member located at a distance from each other on opposite sides of said viewing opening.

4. The scanner of claim 1 further comprising
   an access opening, in addition to the viewing opening, extending downwards from an edge of the viewing opening, and an interior chamber extending between the viewing opening and the cover glass and laterally bordering on the access opening.

5. The scanner of claim 4 having strip-shaped light sources arranged in opposite walls of the interior chamber.

6. The scanner of claim 5 wherein the light sources are arranged in recesses of the opposite walls.

7. The scanner of claim 5 further comprising optical diffusor elements arranged between the light sources and the chamber.

8. The scanner of claim 3 comprising
an access opening extending downwards from an edge of the viewing opening, and
an interior chamber extending between the viewing opening and the cover glass and laterally bordering on the access opening,
wherein said first and second frame member are located at opposing first and second vertical sides of said scanner, wherein said viewing opening and said access opening are located in planes extending perpendicularly to the first and second sides.

9. The scanner of any of claim 3 wherein the cover glass is arranged not higher than a lower edge of the access opening.

10. The scanner of claim 1 further comprising a non-transparent pinhole mask arranged between the at least one camera and the cover glass, wherein the pinhole mask comprises at least one pinhole located on an optical axis of the at least one camera.

11. The scanner of claim 1 having exactly three or exactly four support members located spaced apart at four corners of a rectangle.

12. The scanner of claim 1 wherein k is at least 0.25.

13. The scanner of claim 1, further comprising a tube rack frame projecting above the support members and defining lateral stops adapted and structured to confine the tube rack in all directions perpendicular to a direction along which the camera is viewing the viewing opening.

14. A code scanner for capturing visual codes at bottom sides of a plurality of test tubes in a tube rack, wherein said scanner comprises
a base,
a tube rack support mounted to the base for supporting a tube rack placed onto said tube rack support,
at least one camera mounted to said base, wherein said camera comprises imaging optics focused on an object plane at a level of said tube rack support,
a transparent cover glass arranged between the camera and the object plane,
wherein said tube rack support has a viewing opening and, at several locations around said viewing opening, support members for laterally supporting the tube rack,
wherein the cover glass is located at a distance from and below the support members, and
wherein said viewing opening has a width between 80 mm and 90 mm and a length between 120 mm and 135 mm.

15. A method for operating a code scanner for capturing visual codes at bottom sides of a plurality of test tubes in a tube rack, wherein said code scanner comprises
a base,
a tube rack support mounted to the base for supporting a tube rack placed onto said tube rack support,
at least one camera mounted to said base, wherein said camera comprises imaging optics focused on an object plane at a level of said tube rack support,
a transparent cover glass arranged between the camera and the object plane,
an access opening extending downwards from an edge of the viewing opening, and
an interior chamber extending between the viewing opening and the cover glass and laterally bordering on the access opening,
wherein said tube rack support has a viewing opening and, at several locations around said viewing opening, support members for laterally supporting the tube rack, and wherein the cover glass is located at a distance from and below the support members,
wherein said method comprises
placing a tube rack on the tube rack support and
scanning the visual codes on a plurality of test tubes in said tube rack by viewing them with the camera through the viewing opening, and
wherein said method comprises at least one of:
moving a shovel supporting the tube rack from above through the viewing opening to deposit the tube rack on the rack support and then retrieving the shovel through the access opening, or
inserting the shovel through the access opening and raising it through the viewing opening, thereby picking up the tube rack deposited on the rack support.

16. A code scanner for capturing visual codes at bottom sides of a plurality of test tubes in a tube rack, wherein said code scanner comprises
a base,
a tube rack support mounted to the base for supporting a tube rack placed onto said tube rack support,
at least one camera mounted to said base, wherein said camera comprises imaging optics focused on an object plane at a level of said tube rack support,
a transparent cover glass arranged between the camera and the object plane,
wherein said tube rack support has a viewing opening and, at several locations around said viewing opening, four support members located spaced apart at four corners of a rectangle for laterally supporting the tube rack, and wherein the cover glass is located at a distance from and below the support members, and
wherein a distance between neighboring support members is at least 0.9 times an extension of a side of the rectangle between the respective neighboring support members.

17. The scanner of claim 16, wherein for
D1 being a distance between the cover glass and a top of the tube rack support and
D2 being an optical distance between the imaging optics and the top of the tube rack support, $$D1 > k \cdot D2,$$

with k being at least 0.1.

* * * * *